US Patent

Decker et al.

[15] 3,671,566
[45] June 20, 1972

[54] MANUFACTURE OF ADIPONITRILE

[72] Inventors: Martin Decker; Joseph Schmidt, both of Ludwigshafen; Herwig Hoffmann, Frankenthal; Hans Joachim Pistor, Walldorf, all of Germany

[73] Assignee: Badische Anilin- & Soda-Fabrik Aktiengesellschaft, Ludwigshafen (Rhine), Germany

[22] Filed: March 30, 1970

[21] Appl. No.: 23,675

[30] Foreign Application Priority Data

April 1, 1969 Germany..................P 19 16 601.9

[52] U.S. Cl...............................260/465.2, 203/95, 203/96
[51] Int. Cl..........................................................C07c 121/10
[58] Field of Search....................................260/465.2; 203/95

[56] References Cited

UNITED STATES PATENTS 2,132,849  10/1938  Greenewalt et al.................260/465.2
3,153,084  10/1964  Veazey et al.......................260/465.2
3,242,204  3/1966   Decker et al.......................260/465.2
3,325,532  6/1967   Rushton et al.....................260/465.2
3,393,222  7/1968   Schwarz et al.....................260/465.2

Primary Examiner—Joseph P. Brust
Attorney—Johnston, Root, O'Keefe, Keil, Thompson & Shurtleff

[57] ABSTRACT

Production of adiponitrile by introducing adipic acid in solid powder form or in liquid form and simultaneously introducing ammonia into a fluidized bed of a usual catalyst at a temperature of from 250° to 420°C and recovering the adiponitrile from the reaction gases by fractional distillation wherein there is added to the reaction gas before entry into the distillation column sufficient water to make the molar ratio of water vapor to ammonia 0.8 to 1.5 in the mixture entering the column. Adiponitrile is an intermediate in the manufacture of synthetic fibers of, for example, nylon 6.6.

3 Claims, 1 Drawing Figure

PATENTED JUN 20 1972
3,671,566
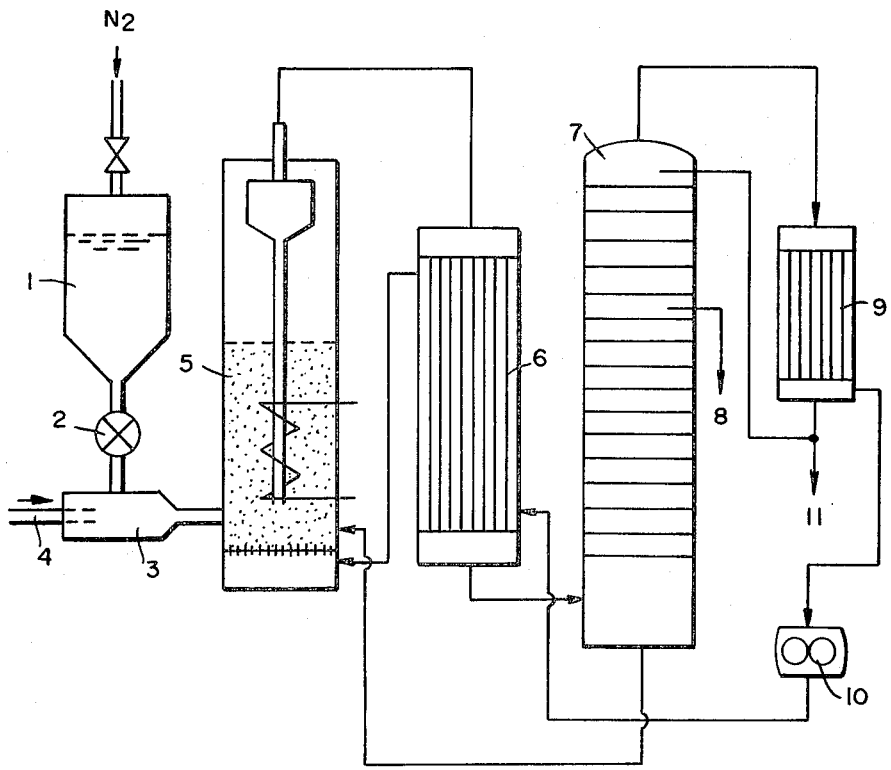
INVENTORS:
MARTIN DECKER
JOSEPH SCHMIDT
HERWIG HOFFMANN
HANS JOACHIM PISTOR
BY
Johnston, Root, O'Keeffe, Keil, Thompson & Shurtleff
ATT'YS

MANUFACTURE OF ADIPONITRILE

This invention relates to the manufacture of adiponitrile from ammonia and adipic acid.

German Published Application DAS 1,196,179 discloses a convenient method of continuously making adiponitrile from adipic acid and ammonia over finely divided catalysts at 250° to 550°C which comprises introducing adipic acid in the form of a solid free-flowing powder into a stream of ammonia and introducing the said stream, containing the adipic acid, at a temperature of less than 50°C, into a fluidized bed which has been heated to the reaction temperature and is produced by means of an ammonia stream. The vaporous reaction mixture is worked up by condensation, separation of the organic layer, extraction of the aqueous layer with toluene and distillation followed by fractionation of the organic phase. Working up may alternatively be carried out by the method disclosed in the German Published Application DAS No. 1,279,009 which comprises feeding the vaporous reaction mixture, held at a temperature not substantially lower than the reaction temperature, to the lower part of a fractionating column, allowing water or an aqueous ammonia solution to pass down the column from its head countercurrently to the rising reaction gases and withdrawing liquid adiponitrile as the bottoms and a mixture of water and ammonia vapor as the top product. Yet another working up method is described in German Patent No. 857,194 and comprises retaining only the higher boiling intermediates and distilling off the adiponitrile, ammonia and water together through the column and then fractionating. Finally, by introducing the vaporous reaction mixture at a suitable point along the column the difficulty volatile products may be withdrawn at the bottom of the column, whilst pure adiponitrile is withdrawn in a branch in the middle portion of the column and ammonia and water are withdrawn at the top of the column. In all of these methods there is the drawback that the distillation column fouls relatively quickly. This is particularly so when the reaction is carried out in the upper region of the usual temperature range or when a very large excess of ammonia over adipic acid is used in order to achieve a higher conversion of the adipic acid, as in such cases the side-reactions increase.

It is an object of the invention to provide a process for the manufacture of adiponitrile from adipic acid and ammonia in which fouling of the distillation column may be largely reduced even where a high ammonia to adipic acid ratio is used and/or high conversion rates of the adipic acid are expected. This and other objects and advantages of the invention will be better understood from the following detailed description.

We have found that adiponitrile may be produced from adipic acid and ammonia without and above-mentioned drawbacks by passing solid powdered adipic acid or molten adipic acid into a fluidized catalyst bed heated at a temperature of from 250° to 420°C, preferably from 300° to 375°C, concurrently introducing ammonia and isolating the resulting adiponitrile from the reaction gases by rectification in a column, provided that sufficient steam is added to the reaction gases before they enter the rectifying column to make the molar ratio of steam to ammonia on entering the column 0.8 to 1.5, preferably 1.0 to 1.3.

Fouling of the distillation column is virtually completely overcome by the process of the invention.

The reaction conditions are largely known. The adipic acid is fed to the reaction zone as a powder, that is, with a particle size of up to about 0.5 mm. Although larger crystals may be used, their use makes the pneumatic transport of the powder to the reaction chamber increasingly difficult. Adipic acid as produced commercially and containing from about 0.1 to 0.2 percent of water by weight may also be used. Intermediate drying is not necessary, even if the water content is as high as 1 percent by weight. The adipic acid is introduced into a stream of ammonia heated at about 50°C, preferably in the presence of a small amount of an inert gas such as, in particular, nitrogen. The inert gas is conveniently used in a concentration of from 0.001 to 0.02 part, preferably from 0.003 to 0.006 part, per part of ammonia, by volume, corresponding to from 0.1 to 2 percent, preferably from 0.3 to 0.6 percent v/v of the ammonia used.

For the transport of the adipic acid about 0.2 part of ammonia is required per part of adipic acid, by weight. The amount of ammonia required depends to a certain extent on the nature of the adipic acid. Usually from 0.2 to 0.5 cubic meter (S.T.P.) of ammonia is used per kilo of adipic acid. However, larger quantities of ammonia may be used if desired. Where the adipic acid is in the form of an extremely dry fine powder, less ammonia will be necessary than with coarse powdered adipic acid containing some water. Alternatively, molten adipic acid may be introduced directly into the fluidized bed, for example by injection. Ammonia is fed to the fluidized catalyst at an appropriate rate. The catalyst is maintained at the desired reaction temperature, this being achieved either by feeding in heated ammonia or, more conveniently, by employing external heating jackets around the fluidized bed or internal heating means in the fluidized bed to heat it at the reaction temperature. The fluidized bed itself is conveniently produced by the ammonia stream. The reaction temperature ranges from 250° to 420°C and preferably from 300° to 375°C. The process is usually carried out at ambient pressure. It can however, be carried out at reduced pressure or slightly elevated pressure, for example 1.2 atmospheres, if desired. Suitable dehydrating catalysts are, for example, silica gel, boron phosphate or catalysts containing phosphoric acid, which may be activated by small amounts of alkali metal oxides and/or magnesium oxide. We have found catalysts comprising phosphoric acid supported by silica gel to be particularly useful. Since the catalyst is maintained in fluidized motion during the reaction, particle sizes of from 0.1 to 0.4 mm diameter are preferred. The amount of catalyst used and the rate of flow of the ammonia required to produce the fluidized bed are such that the adipic acid and, when formed, the adiponitrile have residence times of from 3 to 6 seconds based on the empty reaction chamber under the reaction conditions. Ammonia is used in a total amount of at least 2 moles per mole of adipic acid. Generally, however, it is used in excess, for example from 4 to 20 moles of ammonia per mole of adipic acid, and even greater excesses are possible, as is desirable where high conversions of adipic acid are required. The ammonia is conveniently maintained in circulation. Where a small quantity of nitrogen is introduced into the circulation with the adipic acid, it is desirable to tap off a suitable proportion of the gas leaving the following distillation column in order to keep the nitrogen content of the circulating gas at or below 10 percent.

The process may be carried out as follows, for example:

The vaporous reaction mixture leaving the reaction chamber is fed to the lower third of a distillation column, sufficient steam being added to the said stream before it enters the column to achieve a molar ratio of steam to ammonia in the reaction gases of from 0.8 to 1.5, preferably of from 1.0 to 1.3, before entry into the column. The water of reaction is included in the above ratios. The components which boil at higher temperatures than adiponitrile are then withdrawn from the bottom of the column. At the top of the lower third of the column a fraction is withdrawn which consists essentially of adiponitrile. It may be further purified by fractionation in a lateral column. At the top of the column ammonia and water vapor together with any entrained inert gas are drawn off. The bottoms include adipic acid and incompletely converted adipic acid derivatives, such as adipamide, adipyl diamide or adipamidonitrile. It is therefore advantageous to recycle these higher boiling components through the catalyst bed. Due to their physical properties, it is advantageous to inject the said higher boiling components into the fluidized catalyst bed in the molten state.

In an alternative, and technologically advantageous, embodiment, the steam, instead of being added after the reaction of the adipic acid with the ammonia in the fluidized catalyst bed but before entry into the distillation column, is injected directly into the catalyst bed. When the steam is added in this manner to the fluidized bed the formation of cyclic by-products which tend to resinify is reduced.

The process will now be described with reference to one embodiment illustrated in the accompanying diagram, to which it is not limited.

Adipic acid powder is conveyed from a storage tank 1 by a rotary valve 2 to a solids conveyer 3, by means of which it is conveyed, with the aid of ammonia entering via the pipe 4, to the fluidized bed 5. The catalyst is kept at the reaction temperature by a heating coil. Following the reaction, the reaction gases pass through a heat exchanger 6 where they transfer some of their heat to the ammonia used for producing and heating the fluidized bed. The gases, now at a temperature which is from 100° to 140°C lower, then pass to the distillation column 7. At the same time steam is blown into the column either together with the reaction gases or from below, the temperature of the steam being the same as or higher than that of the reaction gases on entering the column. From the base of the column there is withdrawn a high boiling residue which is advantageously recycled to the reactor 5. At approximately the top end of the middle third of the distillation column 7, at point 8, there is formed crude adiponitrile which may be worked up, either in a lateral column (not shown) or by separate fractionation under reduced pressure, to pure adiponitrile. The water of reaction, the water added, excess ammonia and volatile components are drawn off at the top of the column. The condensible portions are condensed in the condenser 9. Part of the water in refluxed to the top of the column. The non-condensible portions leaving the condenser 9 are recycled by blower 10 to the reactor 5.

Alternatively, the steam may be injected directly into the fluidized bed in the reaction chamber 5 via a pipe not shown in the drawing.

In the following examples the parts are by weight unless otherwise stated. Parts by weight relate to parts by volume as the kilogram to the cubic meter (S.T.P.).

EXAMPLE 1

Adipic acid powder is conveyed at the rate of 823 parts per hour from a storage tank 1 by a rotary valve 2 and a solids conveyor 3 to the fluidized catalyst bed in reactor 5 by means of 74 parts of ammonia by volume per hour. The catalyst consists of particulate silica gel carrying 20 percent of phosphoric acid and 1 percent of sodium oxide, by weight. The quantities and rates of flow used are such that the residence time in the fluidized bed is from 3 to 5 seconds. The reaction is carried out at 360°C. The reaction gases leave reaction chamber 5 and transfer some of their heat in heat exchanger 6 to the ammonia flowing to the reactor. The reaction mixture passes in vaporous form and at a temperature of from 220° to 260°C to distillation column 7. 200 parts of steam are passed at a temperature of 260°C to the base of the column, per hour. From 90 to 100 parts of a pale yellow distillate consisting of approximately 60 percent of adiponitrile and 40 percent of adipamides are withdrawn from the base of the column 7, per hour. These bottoms are recycled to reaction zone 5. From the upper third of distillation column 7 there are removed 597 parts of crude adiponitrile per hour, which yields, by fractionation under reduced pressure, 588 parts of pure adiponitrile having a cyano cyclopentenamine content of approximately 0.3 to 0.4 percent.

At the head of column 7 there are separated the water of reaction, excess ammonia, the water added, small amounts of cyclopentanone and cyano cyclopentanone and other volatile components, if present. The condensable portions are condensed in condenser 9. About 250 to 270 parts of the water of reaction are refluxed to the head of the column. It contains only traces of adiponitrile. The non-condensable portions are recycled to the reaction zone 5 via blower 10. A small proportion thereof is tapped off for the removal of inert gas.

If, for comparison, the distillation is carried out without the addition of steam, a resinous deposit slowly forms in the column. Cleaning is usually necessary after only 14 days, but the column may be used continuously for months when steam is added as described.

EXAMPLE 2

If the procedure described in example 1 is repeated except that the steam, instead of being fed to the base of the column, is passed to the fluidized bed in the reactor, adiponitrile of even greater purity is obtained, its concentration of cyano cyclopentenamine being normally less than 0.3 percent.

What we claim:

1. A process for the manufacture of adiponitrile from adipic acid and ammonia which comprises introducing solid adipic acid powder having a particle size of up to 0.5 mm or molten adipic acid into a fluidized catalyst of phosphoric acid on a silica gel carrier heated at a temperature of from 250° to 420°C, concurrently introducing ammonia in a ratio of 4 to 20 moles of ammonia per mole of adipic acid, adding steam to the product gases before entry into a distillation column such that the molar ratio of steam to ammonia in the resulting gas mixture on entering the column is about 0.8 to 1.5, fractionating the gas mixture thus obtained in said distillation column and isolating the adiponitrile.

2. A process as claimed in claim 1 in which the catalyst temperature is from 300° to 375°C.

3. A process as claimed in claim 1 in which the ratio of steam to ammonia on entering the column is 1.0 to 1.3.

* * * * *